Figure 1:
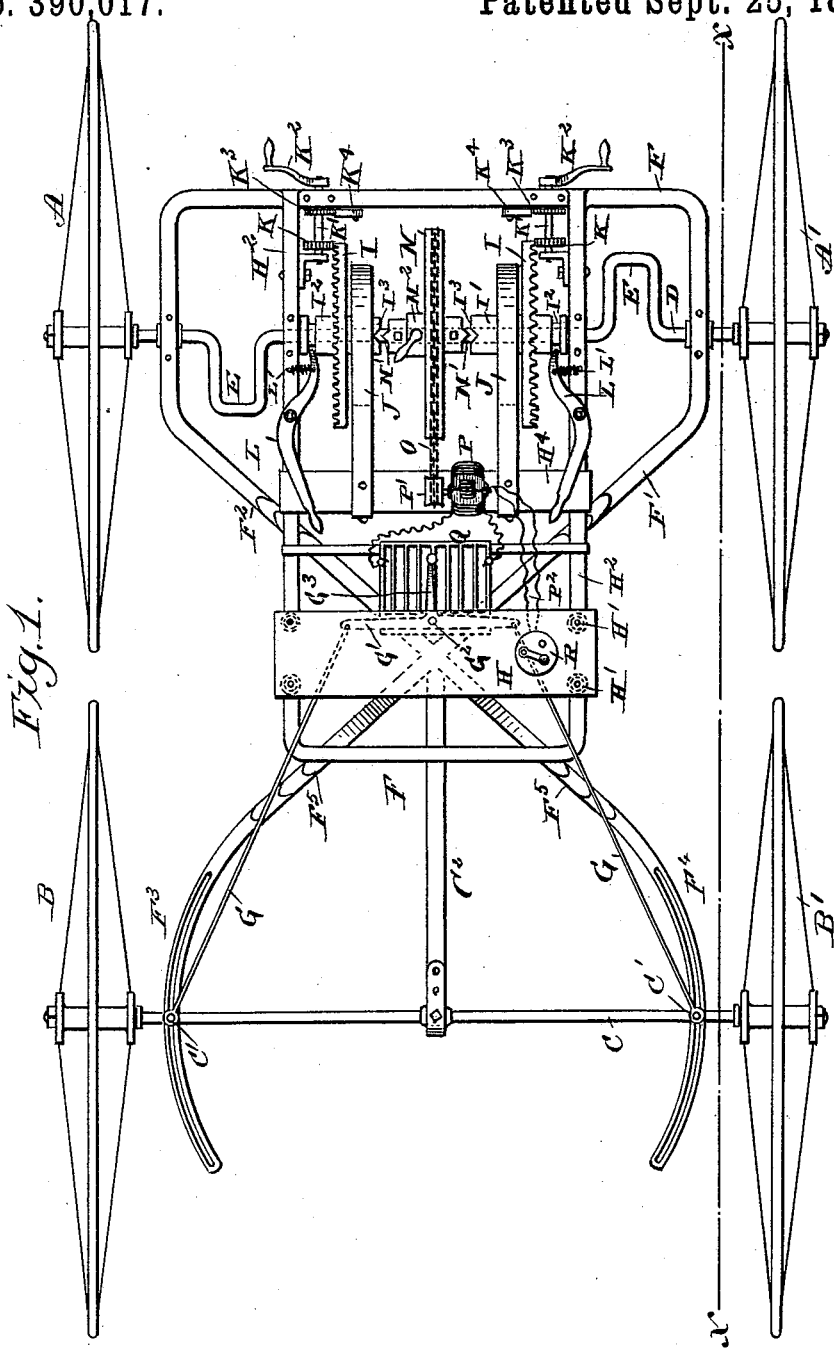

(No Model.) 2 Sheets—Sheet 1.

J. HAGAN.
VELOCIPEDE.

No. 390,017. Patented Sept. 25, 1888.

WITNESSES:
J. D. Garfield.
C. Sedgwick.

INVENTOR:
J. Hagan
BY Munn & Co.
ATTORNEYS.

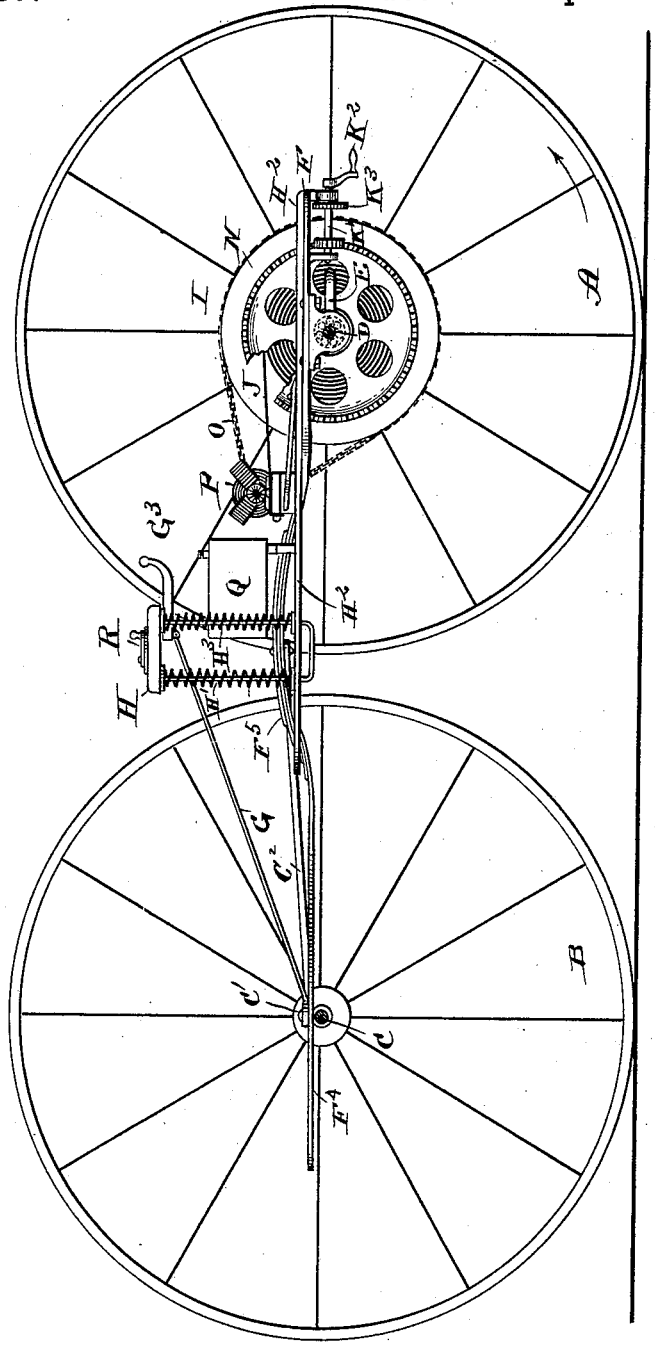

UNITED STATES PATENT OFFICE.

JOHN HAGAN, OF ATLANTIC CITY, NEW JERSEY.

VELOCIPEDE.

SPECIFICATION forming part of Letters Patent No. 390,017, dated September 25, 1888.

Application filed March 17, 1888. Serial No. 267,529. (No model.)

*To all whom it may concern:*

Be it known that I, JOHN HAGAN, of Atlantic City, in the county of Atlantic and State of New Jersey, have invented a new and Improved Vehicle, of which the following is a full, clear, and exact description.

The invention relates to vehicles—such as velocipedes, bicycles, &c.—in which the motive power is furnished by the operator.

The object of the invention is to provide a new and improved vehicle which is very simple and durable in construction and requires little physical power to drive it.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a plan view of the improvement; and Fig. 2 is a sectional side elevation of the same on the line $x\ x$, Fig. 1.

The improved vehicle is provided with the main driving-wheels A A' and the rear steering-wheels, B B', which latter are loosely mounted on the rear axle, C, while the front main driving-wheels, A A', are rigidly secured to the axle D, which is provided with two crank-arms or pedals, E, extending in opposite directions from each other, as is plainly shown in Fig. 1.

The axles D and C support the main frame F, provided with the two arms F' and $F^2$, crossing each other, and provided at their outer ends with the segmental slotted parts $F^3$ and $F^4$, respectively, resting on the rear axle, C. Through the slots in the parts $F^3$ and $F^4$ pass studs or pins C', secured to the rear axle, C. Centrally to the axle C is clipped the rear end of the bar $C^2$, which, extending forward, is pivoted to the arms F' $F^2$. On each pin C' is secured one end of a rod, G, extending inward and pivotally connected with the outer ends of a lever, G', fulcrumed at $G^2$ to the under side of the seat H. From the lever G' extends forward an arm, $G^3$, which projects from under the seat H, and can be operated by the operator seated on the seat H, either by his feet or his hands, in order to steer the vehicle. The middle parts of the arms F' and $F^2$ of the main frame F are formed into the springs $F^5$ on which is located a frame, $H^2$, in which are held to slide the vertical rods H', which support the seat H, above mentioned, at their upper ends. The springs $H^3$ are coiled on the said rods H' and their upper ends rest on the under side of the seat H, their other ends resting on the frame $H^2$. The seat H is thus supported yieldingly and the frame $H^2$ is similarly mounted on account of being supported on the springs $F^5$ of the main frame F.

On the main driving-axle D, between the forward arms of the frame $H^2$, are mounted to rotate loosely the gear-wheels I, each having a hub, I', on which is secured the inner end of a coil-spring, J, secured by its other end to a cross-bar, $H^4$, fastened on the frame $H^2$. Into each gear-wheel I meshes a pinion, K, secured on a shaft, K', mounted to rotate in suitable bearings on the frames F and $H^2$. On the outer end of each of the said shafts K' is secured a crank-arm, $K^2$, for turning said shaft K' and pinion K, so that the latter imparts a rotary motion to the gear-wheel I. A ratchet-wheel, $K^3$, is also secured on each of the said shafts K' and is engaged by a pawl, $K^4$, pivoted on the frame F.

On the outer end of the hub I' of each gear-wheel I is formed an annular recess, $I^2$, engaged by one end of a lever, L, fulcrumed on the frame $H^2$ and adapted to slide the said gear-wheel I on the main axle D. On the inner end of each hub I' of the gear-wheel I is formed a notch, $I^3$, adapted to engage a corresponding projection, N', formed on the hub $N^2$ of a wheel, N, secured to the main axle D in its middle. When the lever L is shifted, the gear-wheel I is moved inward so that its notch $I^3$ engages the projection N', whereby the gear-wheel I is coupled to the main driving-shaft D. A spring, L', fastened by one end to the said lever L and by its other end to the frame $H^2$, serves to throw the lever L back to its former position as soon as the operator releases his pressure on the said lever.

The wheel N is preferably a sprocket-wheel, and over its periphery passes a sprocket-chain, O, also passing over a sprocket-pinion, P', secured to the shaft of an electric motor, P, of any approved construction and deriving its motive power from batteries Q, supported on the frame H². The motor P is also connected by wires P² with a switch, R, located on top of the seat H and serving to start or stop said electric motor P. The bearings of the main driving-shaft D are preferably ball-bearings of any approved construction.

The operation is as follows: The operator seated on the seat H may use either his feet or his hands for turning the crank-arms E, so as to impart a rotary motion to the main axle D and to the wheels A and A', whereby the vehicle is propelled forward or backward, according to the direction in which the crank-arms E are turned. When the operator drives up a hill he can set the motor P in operation by turning the switch R, so that the motive power of the motor P is transmitted by the pinion P', the chain O, and the sprocket-wheel N to the main axle D, so as to relieve the operator from turning the crank-handles E. The operator may also store a considerable amount of power by turning the crank-arms K², so as to impart a rotary motion to the gear-wheels I, thus winding up the coil-springs J. The latter are held in a coiled-up position by the pawls K⁴ engaging the ratchet-wheels K³, and thus preventing a return movement of the shafts K. When the operator desires to use the stored power of the wound-up springs J, he shifts the levers L so as to throw the hubs I' of the gear-wheels I into contact with the projections N' on the hub N² of the wheel N, secured to the main driving-axle D. This sliding movement imparted to the gear-wheels I disconnects the latter from the pinions K, thus unlocking the said gear-wheels I, whereby the coiled-up springs J can exert their power against the hubs I' and turn the same, so as to impart a rotary movement to the main axle D.

It is understood that the motive power of the two springs J can be used simultaneously or separately for turning the main axle D, and the electric motor P can be used separately or in connection with one or both of the springs J, as desired. When the operator desires to steer the vehicle around a curve, he presses with his knees or his hands against the arm G³ of the steering-lever G', so as to turn the latter, thereby causing the respective ends of the rear axle, C, to be thrown inward or outward, so that the said axle assumes an inclined position in relation to the main axle D. It is understood that the said rear axle, C, swings with its studs C' in the segmental grooves in the ends F³ and F⁴ of the main frame F. Thus it will be seen that the electric motor P and the stored power of the springs J can be utilized to assist the operator in moving the vehicle forward.

Having thus fully described my invention, I claim as new and desire to secure by Letters Patent—

1. In a vehicle, the combination, with the main axle having crank-arms, and driving-wheels rigidly secured on the said axle, of gear-wheels mounted to slide and to turn loosely on the said main axle, a clutch for securing each of the said gear-wheels to the said main axle, a pinion meshing into each of the said gear-wheels, a crank-arm for turning the said pinion, and springs each secured by one end to the main frame and by the other end to one of the said gear-wheels, and a lever for moving each of the said gear-wheels into and out of contact with the clutches on the main axle, substantially as shown and described.

2. In a vehicle, the combination, with the main axle and driving-wheels rigidly secured to the main axle, of a rear axle, wheels mounted loosely on the said rear axle, a frame secured rigidly to the main axle and mounted to swing on the said rear axle, springs formed in the middle of the said frame, a second frame supported on the said springs, rods held to slide on the said second frame and supporting a seat, and springs coiled on the said rods, one end of each of said springs resting on the under side of the said seat and their other ends resting on the said second frame, substantially as shown and described.

3. The vehicle-frame F, provided with the arms F' F², crossing each other and having segmental slotted ends F³ F⁴, the middle parts of the said arms being formed into springs F⁵, substantially as herein shown and described.

4. In a vehicle, the combination, with the front axle, C, of the frame F, provided with arms F' F², crossing each other and having segmental slotted ends F³ F⁴, the three-armed lever G' G³, and the rods G, secured to the pins C', projecting through the slots of the said arms, and to the said lever, substantially as described.

JOHN HAGAN.

Witnesses:
W. M. HIGBEE,
GEO. W. HOWARD.